(12) United States Patent
Chmara et al.

(10) Patent No.: US 11,496,322 B2
(45) Date of Patent: Nov. 8, 2022

(54) IDENTITY MANAGEMENT FOR SOFTWARE COMPONENTS USING ONE-TIME USE CREDENTIAL AND DYNAMICALLY CREATED IDENTITY CREDENTIAL

(71) Applicant: Entrust, Inc., Dallas, TX (US)

(72) Inventors: Thomas P. Chmara, Richmond (CA); Lucas J. Koops, Kanata (CA); Jon Ferguson, Gloucester (CA)

(73) Assignee: ENTRUST, INC., Dallas, TX (US)

( * ) Notice: Subject to any disclaimer, the term of this patent is extended or adjusted under 35 U.S.C. 154(b) by 205 days.

(21) Appl. No.: 16/157,735

(22) Filed: Oct. 11, 2018

(65) Prior Publication Data
US 2019/0356494 A1 Nov. 21, 2019

Related U.S. Application Data

(60) Provisional application No. 62/674,283, filed on May 21, 2018.

(51) Int. Cl.
*H04L 29/06* (2006.01)
*G06F 21/64* (2013.01)
(Continued)

(52) U.S. Cl.
CPC ........ *H04L 9/3263* (2013.01); *G06F 9/45558* (2013.01); *H04L 9/006* (2013.01);
(Continued)

(58) Field of Classification Search
CPC ..... H04L 9/3263; H04L 9/321; H04L 9/3228; H04L 9/0825; H04L 9/0866; H04L 63/102; H04L 9/006; G06F 9/45558
(Continued)

(56) References Cited

U.S. PATENT DOCUMENTS

| 8,261,061 B2 * | 9/2012 | Leonard | H04L 51/00 |
| | | | 713/155 |
| 9,467,297 B2 * | 10/2016 | Clish | G06F 21/445 |

(Continued)

FOREIGN PATENT DOCUMENTS

WO 2017/028317 A1 2/2017

OTHER PUBLICATIONS

European Patent Office; International Search Report and Written Opinion; International Application No. PCT/US2019/033202; dated Sep. 10, 2019.

(Continued)

*Primary Examiner* — Haresh N Patel (57) ABSTRACT

One or more computing devices employs a method that includes requesting a transient credential (e.g., a one-time PKI certificate) as a first identity credential for an application component instance based on a unique identifier associated with the application component instance. The method includes requesting a dynamically-created second identity credential for the application component instance of the application using a request signed (e.g., using the public key of the first identity PKI certificate) based on the transient credential. The method includes receiving the dynamically-created second identity credential and using the dynamically-created second identity credential in a cryptographic function by the application component instance; and managing the replacement of this credential in environments without persistent archival storage accessible by the device/ application.

16 Claims, 7 Drawing Sheets

(51) Int. Cl.
   *G06F 21/10* (2013.01)
   *H04L 9/32* (2006.01)
   *H04L 9/08* (2006.01)
   *H04L 9/40* (2022.01)
   *G06F 9/455* (2018.01)
   *H04L 9/00* (2022.01)
   *G06F 21/12* (2013.01)

(52) U.S. Cl.
   CPC .......... *H04L 9/0825* (2013.01); *H04L 9/0866* (2013.01); *H04L 9/321* (2013.01); *H04L 9/3228* (2013.01); *H04L 63/102* (2013.01); *G06F 2009/45587* (2013.01)

(58) Field of Classification Search
   USPC .......................................... 726/156; 713/156
   See application file for complete search history.

(56) References Cited

U.S. PATENT DOCUMENTS

| | | | |
|---|---|---|---|
| 10,073,856 B1* | 9/2018 | Cooper | G06F 16/1844 |
| 2010/0082975 A1* | 4/2010 | Metke | H04L 63/064 |
| | | | 713/157 |
| 2013/0151402 A1* | 6/2013 | Howard | G06Q 20/327 |
| | | | 705/40 |
| 2013/0160134 A1* | 6/2013 | Marcovecchio | G06Q 20/3227 |
| | | | 726/26 |
| 2014/0115329 A1* | 4/2014 | Sturonas | G06F 21/6218 |
| | | | 713/165 |
| 2014/0289830 A1* | 9/2014 | Lemaster | H04L 63/08 |
| | | | 726/7 |
| 2015/0312246 A1* | 10/2015 | Mattsson | G06F 16/2455 |
| | | | 726/26 |
| 2016/0112871 A1* | 4/2016 | White | H04W 12/08 |
| | | | 726/4 |
| 2016/0248752 A1* | 8/2016 | Blinn | H04L 63/0838 |
| 2017/0012968 A1 | 1/2017 | Feng et al. | |
| 2017/0032111 A1* | 2/2017 | Johansson | H04L 63/0884 |
| 2017/0048215 A1* | 2/2017 | Straub | H04L 63/06 |
| 2017/0118196 A1* | 4/2017 | Ponsini | H04L 9/3265 |
| 2017/0126642 A1* | 5/2017 | Basin | H04L 9/3247 |
| 2017/0141928 A1* | 5/2017 | Androulaki | H04L 9/0866 |
| 2017/0279785 A1* | 9/2017 | Kent | H04L 63/0823 |
| 2018/0006884 A1* | 1/2018 | Zimmermann | H04L 43/04 |
| 2018/0007037 A1* | 1/2018 | Reese | H04L 9/3297 |
| 2018/0092011 A1* | 3/2018 | Lin | H04W 36/14 |
| 2018/0176023 A1* | 6/2018 | Prickett | G06F 21/51 |
| 2018/0219689 A1* | 8/2018 | Waldron | H04L 9/3265 |
| 2018/0323977 A1* | 11/2018 | Hojsik | H04L 9/0825 |
| 2018/0375870 A1* | 12/2018 | Bernsen | H04L 9/32 |
| 2019/0146816 A1* | 5/2019 | Reno | G06F 9/45504 |
| | | | 718/1 |
| 2019/0197231 A1* | 6/2019 | Meier | G06F 21/41 |
| 2019/0312720 A1* | 10/2019 | Liu | H04L 9/0861 |
| 2019/0349402 A1* | 11/2019 | Shukla | H04L 9/0838 |

OTHER PUBLICATIONS

Huawei Technologies; Discussion on VNF Certificate Generation; vol. ISG-NFV; NFVSEC(15)000043; pp. 1-3; Feb. 15, 2015.

\* cited by examiner

IDENTITY MANAGEMENT FOR SOFTWARE COMPONENTS USING ONE-TIME USE CREDENTIAL AND DYNAMICALLY CREATED IDENTITY CREDENTIAL

RELATED APPLICATION

This application claims priority to Provisional Application Ser. No. 62/674,283, filed on May 21, 2018, having inventors Thomas P. Chmara et al., titled "IDENTITY MANAGEMENT FOR SOFTWARE COMPONENTS", and is incorporated herein by reference.

BACKGROUND

There is a strong desire to confer trusted identities on software components so that applications and users interacting with these components can be assured of the identity of these components. Licensed software (e.g. from Microsoft, Adobe, Intuit) often include license "keys" which claim to confer a "permanent" identity when introduced to that software component. "Whitebox" solutions and other "fingerprinting" algorithms attempt to make use of environmental markers to assemble a unique identity to identify the execution platform—more to detect when the software has been moved or replicated than to correlate to a unique identity.

The move to cloud-based services, and especially software "containers", which are frequently launched and destroyed to manage service capacity—and are often relaunched with modified code bases to apply corrective content or to modify or extend feature content—make it even more-difficult to provide a unique, consistent, provable identity to the software executable or component.

This deployment scenario is challenging because there is no straightforward way to associate a "manufacturing identity" (certificate) with software component instance—or to assign that identity to the container created to replace this one: if public certificates are used, the "private key" which helps to uniquely identify an instance cannot be shared (even with the controlling engine deploying these containers) or it's no longer "private".

BRIEF DESCRIPTION OF THE DRAWINGS

The disclosure will be more readily understood in view of the following description when accompanied by the below figures and wherein like reference numerals represent like elements, wherein.

SUMMARY

The disclosure extends the current state of the art for identity management. Executing software components can employ publicly-verifiable secure unique identities with current solutions but require some form of local persistent storage to securely store those identities (e.g., private keys). This is an impediment for cloud- or virtual-machine hosted, container-based or other deployment models where the executing software's environment is ephemeral and lacks persistent storage for this purpose. This disclosure, in one embodiment, describes a method and apparatus to provide dynamically-managed, cryptographically-secure, unique identity credentials (e.g., certificates) which can be created, assigned, suspended, unsuspended, and revoked without requiring local persistent storage accessible by the device.

In some embodiments a method and apparatus associates one or more externally-verifiable unique cryptographic identity credentials with a software component in a transient software environment. In some embodiments persistent storage is not required. In some embodiments, the secrets (e.g., privates key or shared key) of that identity credential are known only to the software component (i.e. unlike existing solutions where a certificate and keys can be assigned to an entity, the apparatus and methods replace use of that certificate with one where the secrets are known only to the executing image—through a certificate signing request (CSR)). In some embodiments a method and apparatus provide identity credential secrets that are never persistently stored on the device (and thus are more-difficult to compromise). In some embodiments the initial identity credential is associated with a class of entities which should enjoy similar trust (and then be conferred unique identities)—e.g. group identity credential is used to acquire a unique identity credential. In some embodiments a method and apparatus orchestrates a series of identity credentials across removal and reconstitution of software components in such an environment by trusted entities.

In some embodiments if an application is "moved" without reconstitution (e.g. using VMware Corporation's VMotion product's migration of an active executable), the certificate (e.g., identity credential) remains the same and it can continue to be trusted. In some embodiments if a certificate is different—coordination is performed with the (external) trusted entity to update the value which will be used to identify the component. In some embodiments a method and apparatus implement said identity credentials in a container-based framework.

In some embodiments, one or more computing devices employ at least one application component instance, and requests a one-time use identity credential (e.g., a PKI certificate containing a corresponding public key and private key based on data that uniquely identifies the application component instance) as a first identity credential for the application component instance. The computing device requests a dynamically-created second identity credential for the application component instance of the application using a request signed (e.g., using the public key of the first identity credential PKI certificate) based on the one-time use credential. The computing device receives the dynamically-created second identity credential and uses the dynamically-created second identity credential in a cryptographic function by the application component instance.

In some embodiments, one or more computing devices employ at least one application component instance, and requests an identity credential (e.g., a PKI certificate containing a corresponding public key and private key based on data that uniquely identifies the application component instance) as a first identity credential for the application component instance. The computing device requests a dynamically-created second identity credential for the application component instance of the application using a request signed (e.g., using the public key of the first identity credential PKI certificate) based on the identity credential. The computing device receives the dynamically-created second identity credential and uses the dynamically-created second identity credential in a cryptographic function by the application component instance.

In one example, the cryptographic function is an authentication operation. In one example, the request for the dynamically-created (e.g., generated as needed) first identity credential is sent by an application manager. In one example the request for the one-time use credentials associated with the application instance is based on a unique identifier that is information that uniquely identifies the application component instance. In one example, the application component instance interacts with an industrial sensor.

In one example, the one-time use credential and the dynamically-created second identity credential each comprise a PKI certificate produced by a certificate authority (CA).

In one example, a virtual machine receives the generated one-time use credential for the application component instance and passes the generated one-time use credential for the application component instance to a container that makes the first identity credential available to the application component instance.

In another example, one or more computing devices employ at least one application component instance and requests a one-time use credential (e.g., a PKI certificate) as a first identity credential for the application component instance using a unique identifier associated with the application component instance and receives a cryptographically generated one-time use credential as the first identity credential for the application component instance. The computing device employs a virtualization engine that provides the cryptographically generated one-time use credential for use by a container that contains the application component instance.

In another example, to relaunch or replace a component instance, one or more computing devices, requests a replacement dynamically-created first identity credential for a replacement component instance of the first application component instance using the unique identifier of a prior first identity credential associated with the first application component instance. The one or more computing devices receives the dynamically-created replacement first identity credential that includes the cryptographically bound unique identifier of the prior first identity credential associated with the first application component instance. The one or more computing devices requests a dynamically-created second identity credential (e.g., operational identity credential) for the replacement application component instance of the application using a request signed based on the replacement first identity credential. The one or more computing devices receives the dynamically-created second identity credential and uses the dynamically-created second identity credential in a cryptographic operation.

In a "replacement condition"—i.e. where the application is being relaunched—the first (provisioning/manufacturing/enrolment) credential is also replaced. The system provides a correlation of the credentials so that underlying identity (unique identifier) which is defined by the unique attributes of the device or application—each time, uses that same set of attributes to define each new credential.

In one example, the certificate-signing request is signed using the replacement first identity credential associated with the replacement first application component instance. Corresponding methods are also disclosed.

DETAILED DESCRIPTION

Use of Two Identities

In some systems, an initial "manufacturing identity", introduced to a (hardware) device during manufacture, is used to cryptographically "sign" a request for an "operational identity" which can be managed (in a cryptographic sense—i.e. renewed, suspended, revoked). In this disclosure, the "manufacturing identity" is ephemeral—holding an existence for a very brief period of time—and it may be argued that the "operational identity" could be delivered directly.

However, while this direct certificate injection could be supported as an embodiment, it may not be a preferred one: the certificate acquired by the component gives the application a completely secure private key (even the engine does not know it)—whereas the engine does know the manufacturing certificate (and keys). An attacker acquiring the original "manufacturing identity", and knowing everything about the operation of the component, could not use this information to derive this private key.

Because of the structure of digital identifiers (IDs), a single manufacturing certificate can also generate several operations keys (sometimes for different purposes); and the system herein uses this new "production" certificate/key to acquire additional identities for use within the device application or applications.

Component Identity

Each product component already possesses a unique identity (i.e. a unique identifier)—the semantic purpose of each software element is part of the design and operating behavior of the device. For example, an industrial appliance "knows" it has an application component which receives temperature data from the thermocouple connected to USB port 5 on PCI bus 3; another software element on that appliance "knows" that this thermocouple is located at flue vent 13 of furnace 31B.

The challenge is for that component to be able to "prove" its identity to other software elements. Where the component is a statically-linked library executing a thread within the same process, this proof is inherent; where that component is interacting only over a networking connection, a unique, publicly-verifiable identity credential is required to be able to distinguish the legitimate instance from accidental misconfigurations and malicious attackers. This means that any form of authentication must be unique to the usage (note—not to the instance of e.g. the container—but to the application reporting on thermocouple reporting on the temperature at flue vent 13 of furnace 31B).

The identity credential must be verifiable as representing the unique identity—PKI certificates are excellent for this as their behavior is understood and software is readily available to allow verification of a certificate. However, it will be recognized PKI certificates are but one example and that operations described herein may be applicable to symmetric key techniques and other shared secret key techniques.

Containers

Containers are images which combine (usually) single executables and the environment that executable requires; this makes distribution simpler, reduces the likelihood an application will be missing essential environmental or configuration data, and isolates the container from others on the platform. All containers on a platform share the same kernel (which is the "operating system" proper, responsible for controlling access to system resources). A platform can run a combination of containers and traditional images.

Containers, when used in cloud services, are often ephemeral by design, to limit the operations cost of their upgrade, modification, or replacement, with persistent information held outside the container. While the container framework is generic, the containers themselves may contain different executables. Moreover, each container is generally launched with customization information (at a minimum, the proper container, which includes the application which serves the specific role to be satisfied, must be specified with enough detail to allow it to serve its purpose).

Containers are simply a popularization of a software design pattern; the same requirements apply to greater or lesser degree to many or most software applications—but they take some qualities (of isolation) to an extreme. Generic containers are isolated from their host's filesystem, and from its devices. The container manager can grant access to devices when the container is spawned (in Docker™ by specifying "-device <devicepath>")—in recent versions of Docker™ the container no longer needs to be privileged. Network access by a container can be controlled by configuration.

Figure 1:
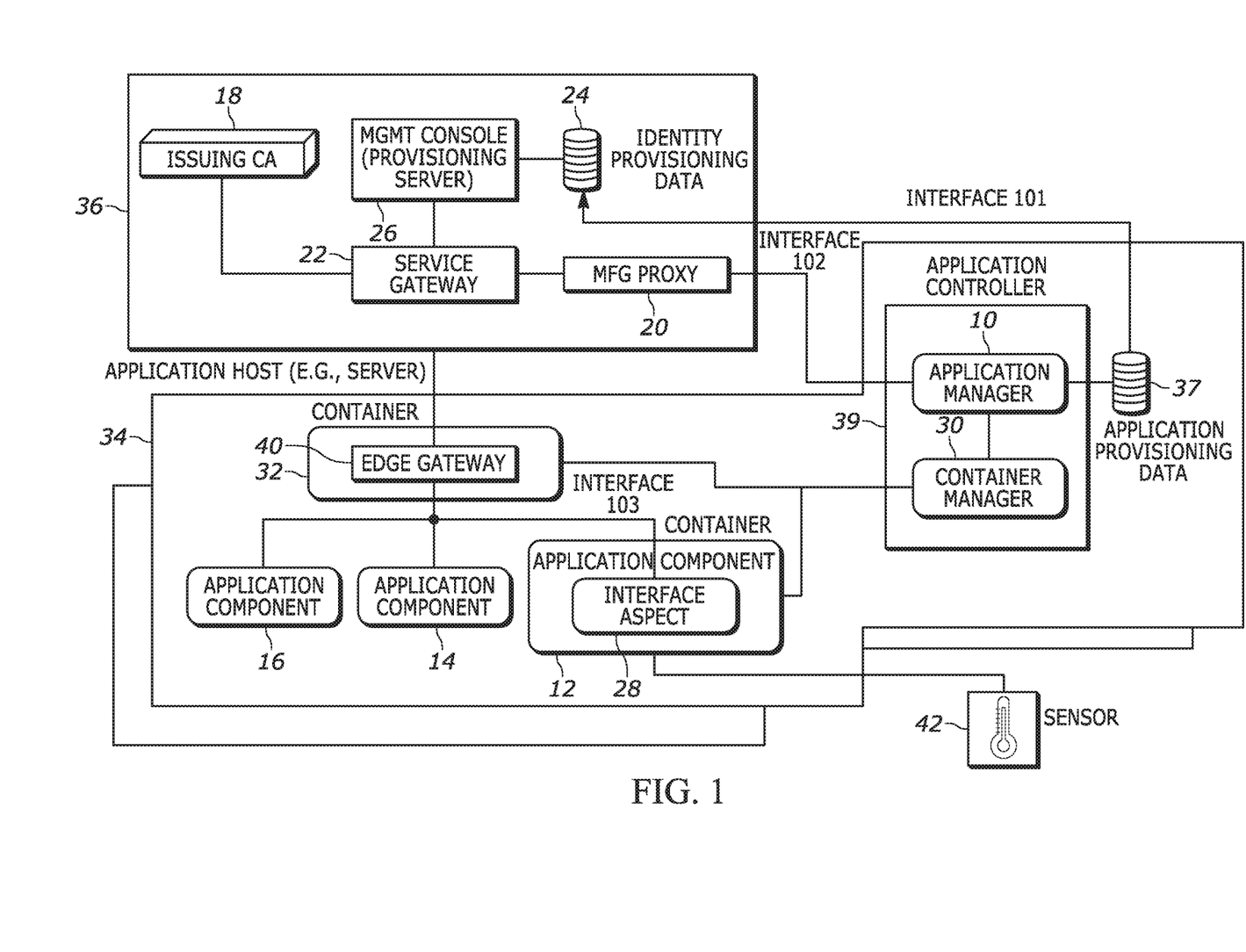
FIG. 1 is a functional block diagram according to one example set forth in the disclosure.

FIG. 1 is an illustration of an embodiment of a container-based implementation of the invention. Note that this is a functional view—each component may itself be implemented as a single element or as a series of elements. An element and/or component, may be implemented in any suitable manner. In some embodiments this includes stored software, firmware or other executable code stored in memory that when executed causes one or more processors to operate as described herein and/or one or more, field programmable gate arrays (FPGAs), application specific integrated circuits (ASICs), or any other suitable logic configured or configurable to perform the operations described herein. In addition or instead of using programmable processors, logic may also be implemented as one or more state machines or other suitable logic where desired. When implemented using one or more processors, the one or more processors may include one or more processing cores of a CPU, GPU or any other suitable structure and may, if desired, be incorporated in one or more devices, Web servers accessible via the Internet, enterprise servers or any other suitable component. Memory may be any suitable memory including but not limited to one or more of RAM, ROM, DRAM, SRAM, optical storage, or any suitable storage and may also include one or more databases.

As can be seen in FIG. 1, in this example, an implementation is shown alongside the applications' primary function: the application requiring a secure identity credential is illustrated by hashed lines, with an embodiment of the invention illustrated by diagonal lines.

Figure 2:
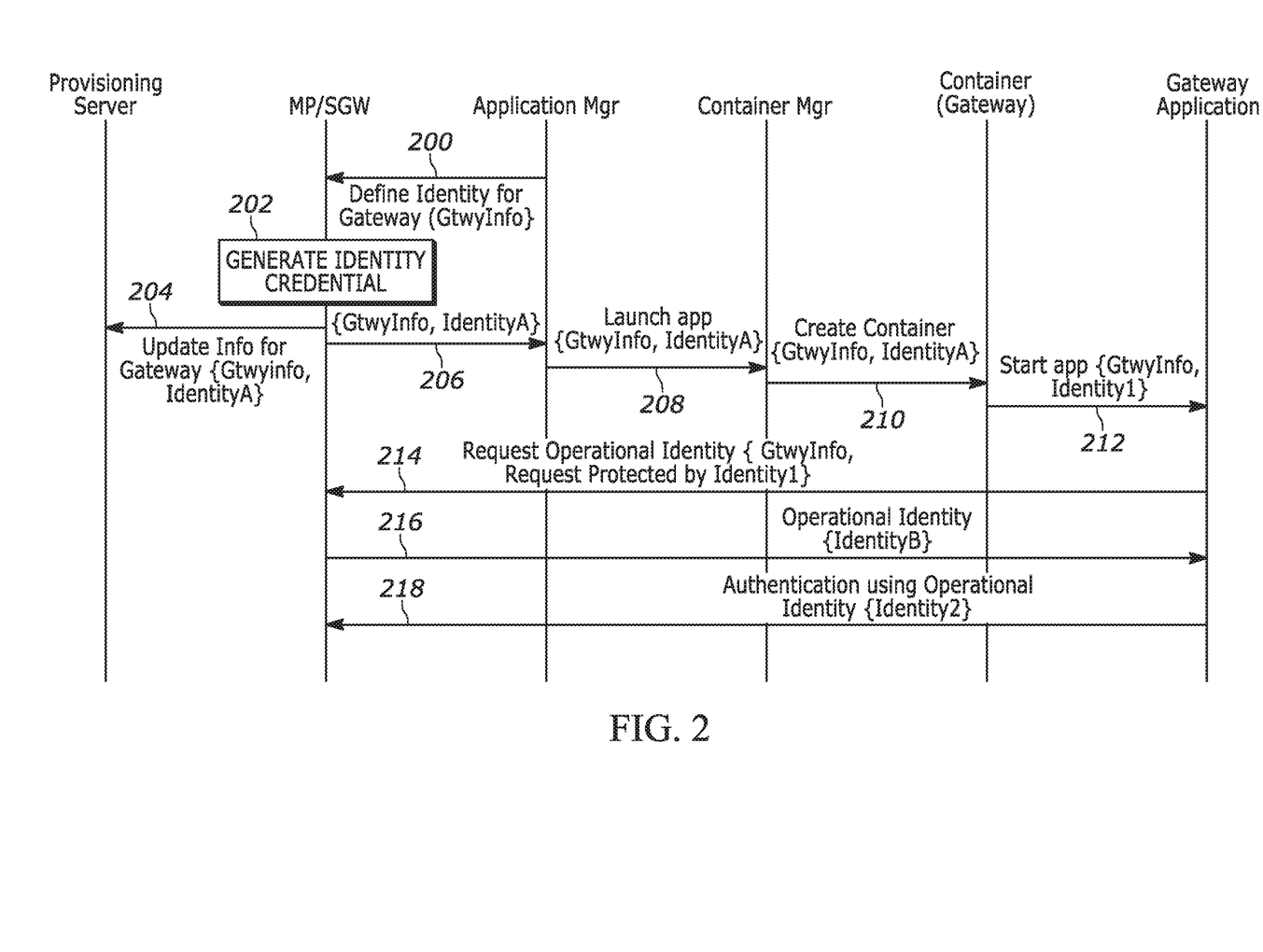
FIG. 2 is a communication flow diagram according to one example set forth in the disclosure.

Referring also to FIG. 2, the application manager 10 of the application determines the number and role of components 12-16 of the application; this can be done dynamically or statically. For example, where dynamic, the application manager performs discovery (to determine the nature and type of the different components, usually validated against a list of permissible/expected components)—as is known in distributed systems and in web-based environments; for static provisioning (especially in industrial systems where a fixed set of elements or components is expected and must exist to allow service) a list of components and their types would be provisioned.

The application manager 10 is provisioned with an identity credential created by and trusted by the issuing CA 18 or any suitable trusted authority; this identity credential may be introduced to the application manager 10 through any means familiar to those with knowledge of this field.

For each component of the application requiring an identity credential, the application manager 10 uses an Interface 101 to request an identity credential 200 by submitting the unique identifier information which uniquely identifies that component in this application (as examples without limiting the generality of the invention, an industrial-sensor application may use information about the node, the sensor, its attachment and configuration; for a financial-services application, the information may comprise a specific user's account information and other credentials). In one example, a Manufacturing Proxy 20 (which exposes interface 101) may be used to submit the identity credential request (e.g., data sufficient to allow creation of a certificate) to a service gateway 22 which includes the unique identity (i.e., unique identifier) for the application component and interacts with the certificate authority (CA) 18 to create 202 a PKI certificate relating to this unique identifying information; the certificate cryptographically binding the unique identification data. The certificate containing the public and private key pair generated using the unique identity is returned 206 to the application manager 10 through interface 101. In one example the identity credential is a one-time use credential that is revoked after use or expires after a defined period of time. However any one-time use mechanisms may be employed. In other embodiments that identity credential need not be a one-time use credential. It will be recognized by practitioners in this field that the specific details of the identity issuance mechanisms may change while remaining still within the scope of this invention.

Appropriate information to recognize this generated identity credential is updated 204 in an identity provisioning database 24 by a management console 26 also referred to as a provisioning server—this can be done internally or explicitly through an interface 102 without loss of generality.

This identity credential is conferred 206 on the component needing externally-verifiable proof of its identity. In an embodiment this identity credential is conferred at component initialization. It will be recognized by practitioners in this field that the identity credential may be introduced to the static executable image or dynamically through any number of means known to practitioners in the field as appropriate to that execution environment; preferred embodiments include without limitation shared memory, initialization parameters, discovery services, initialization messages and mechanisms, and communications services.

This process is repeated for each component requiring a proof of identity.

Each component has been extended with an ability to interact with the disclosed identity management operation over an interface 103 using an interface aspect 28. Each component, prior to engaging in operations requiring a publicly-verifiable secure identity, use this first identity credential to acquire a new, unique, created identity; in a preferred embodiment this is accomplished using a certificate-signing request CSR) signed using this first identity credential (e.g., the public key) and submitted over interface 103. The disclosed identity management operation confirms that the request is valid; in a preferred embodiment this is through examination of the request and its signature; if the request is valid a new identity credential in the form of a digital certificate is returned from the CA 18 over interface 103 through the service gateway 22.

This new identity credential can be used by the component as required for performing cryptographic functions such as but not limited to for example encrypting information, verifying signatures and digitally signing data. As shown by step 208, the application manager 10 instructs the container manager 30 to launch the application for which the identity credential has been provided. The container manager 30 as shown in step 210, creates the container 32. The application host 34, such as a server, starts the application via use of the container 32. The container instructs the gateway application as shown in step 212. One or more servers or service class machine in a data center, generally illustrated as identity management system 36 in this example, includes the service gateway 22, manufacturing proxy 20, issuing certificate authority 18, the provisioning server 26 and the identity provisioning database 24. The identity provisioning data includes the stored certificates issued by the CA 18. The provisioning server 26 may store the public certificate information of the credentials or may reference the CA data. Also, the various functional components may be suitably distributed among multiple devices as desired. The application controller 39 and application host 34 in one example are located in one or more servers (see also FIG. 7), such as a web server or any other suitable device. In this example, a sensor 42 provides information to a respective application component. The services provided herein may, in some examples, be part of a cloud service.

Without limiting the implementation, an alternate embodiment would see the steps 206 and 208 revised to instead generate a "group identity"—e.g. "thermocouple devices deployed at Example.com's Site 1". This "group identity credential", rather than a unique identity credential, would be conferred on components which are characterized by belonging to this "group". The instantiated application would provide unique characteristics for its operational identity, but sign the request with this shared, group, identity, which is only distributed within a controlled environment. This other embodiment sacrifices some traceability for simplicity in deployment.

This initial identity credential may be conferred on the component at its initialization, or as part of a "discovery process"—as an example, Amazon Web Services extended its "Elastic Container Service Agent" to expose an introspection service for applications to acquire information about themselves—the invention is not dependent on how that initial identity credential is delivered to the component.

Elaboration on Step 214 (Initializing the Application)

In some embodiments, each software component includes an aspect 28 (e.g. is linked against a library which defines the interface 103) which permits it to perform required identity operations. The first of these is to acquire a "provisioning identity credential" 206 also referred to as a first identity credential. A "manufacturing" credential is conventionally a long-lived credential which is burned into/tightly-integrated with the device, typically requiring persistent storage. However, the disclosed system effectively replaces the conventional "manufacturing" credential with a "provisioning" credential—one that is short-lived, and revoked after use ("one-time"). Once the first identity credential is deployed the component, via the edge gateway 40, submits a certificate request 214 for an "operational identity", employing the certificate for the provisioning identity credential 206 provided to the container instance on its launch. The CSR (certificate signing request) component will validate the request against the provisioned information in the provisioning database 24, and (if appropriate) return an operational identity 216 for the container using the CA 18 to issue 216 another certificate. This allows the environment to:

confirm only one request is outstanding;
confirm the request is being received from an expected source;
confirm that the request is semantically appropriate;
confirm the credentials used in the request are valid;
Handling Container Replacement.

In the event the container fails (or is terminated and restarted, perhaps to upgrade/update the microservice), this provisioning identity credential is lost: by default, a container has no persistent storage (and there is no obvious way to secure it, even if the gateway should provide such a thing—nor a way to tell which instance should be associated with which certificate). The container manager is responsible for "reaping" (recording the exit status) of the exiting container—so it is completely aware that it is no longer running—and can provide that information to the application manager (which can assess whether that's a desirable outcome—e.g. the application was requested to exit—or whether remedial action needs to be taken). This operational identity credential is then cancelled (in a preferred embodiment, the certificate is revoked) to protect against replay or misuse.

If it is assumed this was an undesired failure of the application, another container (e.g., a replacement container) needs to be started in its stead.

In one preferred embodiment of a container-based application environment, the application manager directs the container manager to launch this replacement container, with a new "initial identity credential" which describes this same application identity, and updates the identity management operation through the interface 103: this update informs the identity management operation that the component is being recreated and the identity management operation is to expect a new identity credential request for this component using the new initial identity credential. The container simply acquires its new certificate (through the workflow described above) and normal operation resumes.

Detecting Compromise

It is desirable to detect compromise and misuse of an identity-management workflow. In some embodiments, the provisioning identity information is passed to the identity management operation, using pre-provisioned credentials to identify the source of that information as a trusted entity. For example, submission of these identifying characteristics of the device/application is performed through the MP API (interface 102). This is done so that the requester is trusted as authentic. A separate credential (pre-provisioned on the application host and used by the application manager 10)—which is trusted by this same CA (usually because it's issued by this same CA, is used.

In some embodiments, the provisioning identity credential will only be used in the context of that device's provisioning information (it isn't valid for any other device, or in the case of a group identity, for any devices not in that group).

A second application (which has acquired that certificate, and device identity) could try to impersonate that device. A window exists during which such an impersonation could occur (until the two transitions were reconciled within the identity management system). It would be difficult to tell which was the "real", and which one(s) were doppelganger(s), but it can be determined that a compromise had occurred.

If an interceptor gets the first ("provisioning") identity credential and uses it first, there are several mitigations.

The system will identify attempts by the intended software to authenticate as being invalid (as another application has already authenticated using that credential) and often will raise alerts or alarms to notify of these events, leading to subsequent investigation. The "intended" software is the legitimate user of the certificate. When the legitimate device attempts to perform actions, the system will detect these requests are coming from an alternate source—there are now (at least) two devices/applications asserting the same identity and proving this using the same credential (and thus violating the requirement that this identity be unique). The system may be unable to determine which is the legitimate one (the arrival of the second will result in alerts or indications that such an error condition has been detected and should be investigated).

Message Flows

In the context of the preferred embodiment and illustrated in FIG. 2, a "gateway" exists which can provide aggregation and administration services; while its role is not directly relevant to this invention, it illustrates how more than one application (and one dependent on another—i.e. the application dependent on the gateway) can be supported by this invention.

Referring again to FIG. 2, stated another way, the application manager 10 is provisioned with an identity credential 206 created by and trusted by the identity management system; this identity may be introduced to the application manager 10 through any means familiar to those with knowledge of this field.

For this gateway, in step 200 the application manager 10 uses an Interface 101 to request an identity credential for this gateway by submitting the unique identifier information "Gtwyinfo" which uniquely identifies that component (e.g., component 12) in this application.

Appropriate information to recognize this generated identity credential is updated at the provisioning server 26—this can be done internally within the identity management system 36, or explicitly through an interface 102 without loss of generality. In this embodiment it is shown also as step 204.

This identity, returned in step 206, is conferred on the component requiring an identity. In a preferred embodiment this identity is conferred at component initialization (steps 208, 210, 212).

Each component has been extended with an ability (e.g., through the interface aspect 28) to interact with the identity management system over an interface 103. This interface can be based on SCEP, EST, or other industry-standard protocol for performing enrollment (to acquire the operations certificate—the "second identity credential" or "proof of identity")—and later for renewal (of the operations certificate). In some embodiments, each component, prior to engaging in systems requiring a publicly-verifiable secure identity, use this first identity credential to acquire a new, unique, created identity; in this embodiment this is accomplished in step 214 using a certificate-signing request signed using this first identity credential and submitted over, for example, interface 103. The identity management system confirms via the CA 18, that the request is valid; in a preferred embodiment this is through examination of the request and its signature; if the request is valid a new second identity credential is returned as shown in step 216 over, for example, interface 103.

This second identity credential is used by the component as required for performing cryptographic functions; in this embodiment this is illustrated in step 218 in the context of an authentication operation.

Figure 3:
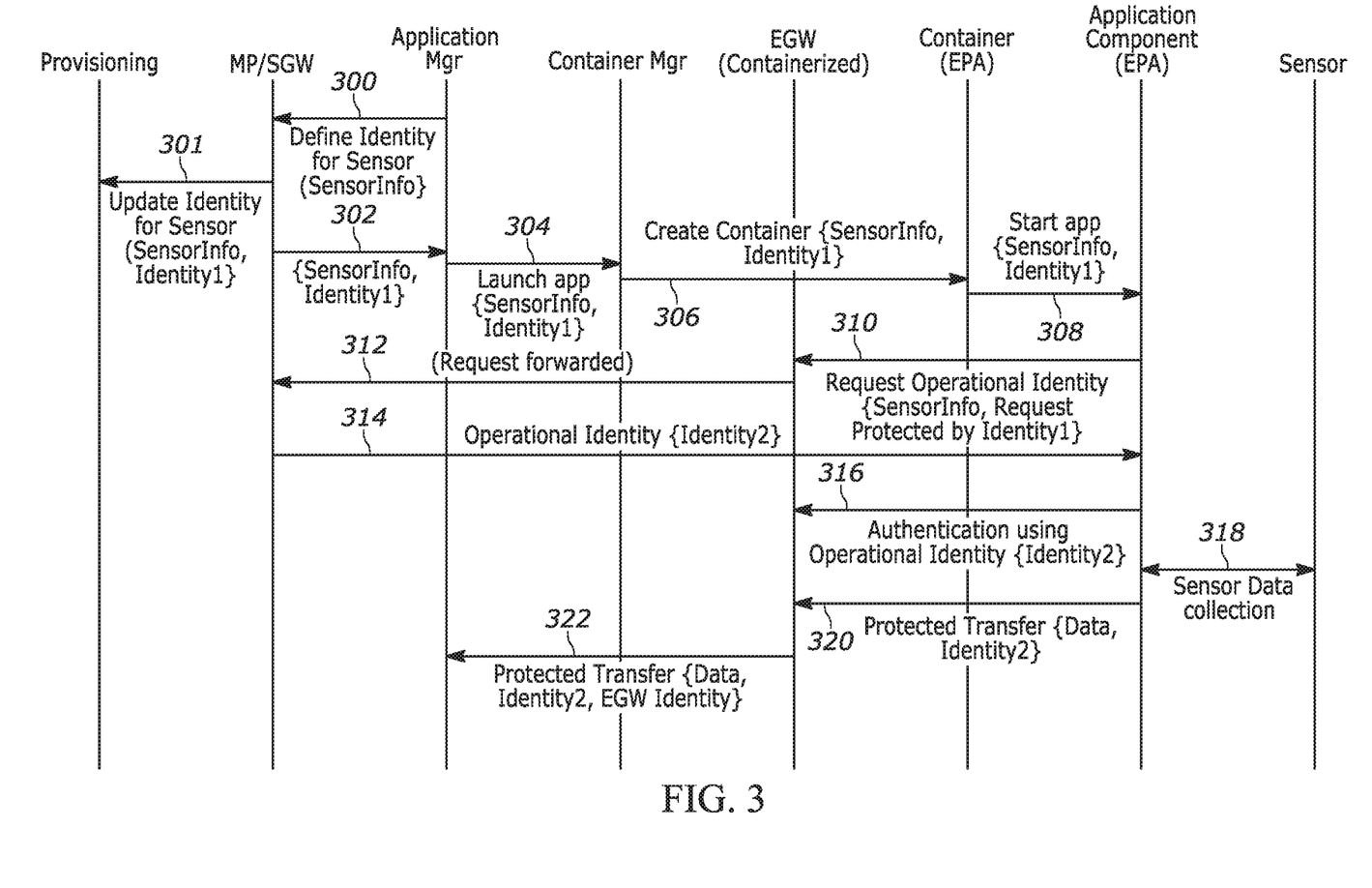
FIG. 3 is a communication flow diagram according to one example set forth in the disclosure.

FIG. 3 illustrates an embodiment in which the "application" (which is launched to monitor a sensor 42 or other device-specific component) is introduced to the application host 34. This message flow illustrates how the acquired provisioning identity can be used in the context of service operation.

FIG. 3 indicates the steps and interactions used to introduce an identity credential to an application which is launched to execute within a software container. In this embodiment, the application interacts with an environment for management of its operational identity through an EGW 40 (edge gateway) which has already been introduced to the environment.

In step 300, the application manager 10 (with reference to FIG. 1) uses, for example, an Interface 101 to request an identity credential for Application component 12 by submitting the unique identifier information "SensorInfo" which uniquely identifies that component in this application. The CA 18 produces the initial identity credential "Identity1" based on the unique identifier information "SensorInfo" that is stored as application provisioning data 37.

Appropriate information to recognize this generated identity credential is updated 301 at a "provisioning" repository or service 26—this can be done internally within the identity management system or explicitly through an interface 102 without loss of generality. In this embodiment it is shown also as step 301.

This Identity1 (first identity credential), returned in step 302, is a certificate containing SensorInfo and corresponding public/private key pair and is conferred on the application component requiring an identity credential. In a preferred embodiment this identity credential is conferred at component initialization (steps 304, 306, 308).

Each application component making use of this process can be extended with an ability to interact with the identity management system 36 over an interface 103 (see FIG. 1). In some embodiments, each component, prior to engaging in operations requiring a publicly-verifiable secure identity (via PKI), use this first identity credential to acquire a new, unique, dynamically-created identity; in this embodiment this is accomplished in step 310 using a certificate-signing request signed using this first identity credential and submitted over, for example, interface 103 (in this preferred embodiment it is forwarded 312 by the EGW, though the delivery of the CSR (certificate signing request) to acquire the certificate can be accomplished through any means familiar to practitioners in the field). The identity management system confirms that the request is valid; in an embodiment this is through examination of the request and its signature; if the request is valid a new identity credential is returned as 314 over, for example, interface 103.

This new identity credential can be used by the component as required for performing cryptographic functions. In this embodiment this is illustrated in step 316 in the context of an authentication operation. As an aspect of this embodiment, that identity credential is used to protect sensor data (received 318 from the sensor 42 monitored by this application component in step 320) conveyed to the application manager (or other destination as appropriate) in steps 322.

Component Exit and Reinstantiation

The steps involved in the exit of an application container and the application component's restoration in a new container are not specifically illustrated in the above message flows and steps but can be described with reference to these earlier Figures and illustrated in FIG. 6. A brief review of those steps associated with an embodiment of a container-based environment are as follows. Practitioners in the field will be aware that this is only one embodiment and can be extended to other execution environments without loss of generality.

The application manager 10 is informed by the container manager 30 that the container has exited. The application manager 10 determines whether the application component 12 needs to be restarted to satisfy the needs of the product. Assuming the application component is to be restarted, the application manager 10 will again interact with this identity management system, with reference to FIG. 3, the application manager 10 informs the interface 101 that the previous operational identity credential "Identity2" is no longer valid and (where the identity is that of an embodiment using a PKI certificate) must be revoked or otherwise rendered invalid (if not a PKI certificate).

The application manager 10 will create a new "Identity1" credential based on the unique identifier information "SensorInfo" and update the identity associated with the sensor in the "provisioning" repository (these steps are similar to those in step 300 of FIG. 3).

The remaining steps are as per FIG. 3, recognizing that because of the actions in step 300, the identity management system is prepared to accept the impending identity request (step 306 in the description of FIG. 3) and issue a new "Identity2" credential for use by the reinstantiated application component.

As illustrated, the request 300 by the application manager for a first identity credential, also referred to as the provisioning identity, which in one example is a public key infrastructure certificate generated using the unique sensor information SensorInfo. The first identity credential (e.g., a certificate also referred to as a T1 (tier 1) credential), is generated by the CA 18. The Identity1 credential is a public key certificate that contains the unique sensor information data (SensorInfo) and one or more public key and private key pairs.

The virtualization engine as noted above, can be a Docker container engine in a container environment but can be implemented as aVM Ware™ virtual engine in a virtual machine environment or in any other suitable manner. The application manager 10 has knowledge of the environment that the applications are being used in. The service gateway 22 acts as the certificate authority's 18 representative and makes requests for revocations of certificates and makes requests for certificates to the CA 18. The provisioning component 26 stores a reference to or a redundant local copy of the certificates issued by the CA 18 as identity provisioning data in the provisioning database 24. The application component runs inside a container and the private keys are not stored in persistent storage by the application component or application. The application employs a cryptographic engine to, for example, sign the request for the operational identity and perform other cryptographic functions as desired.

Figure 4:
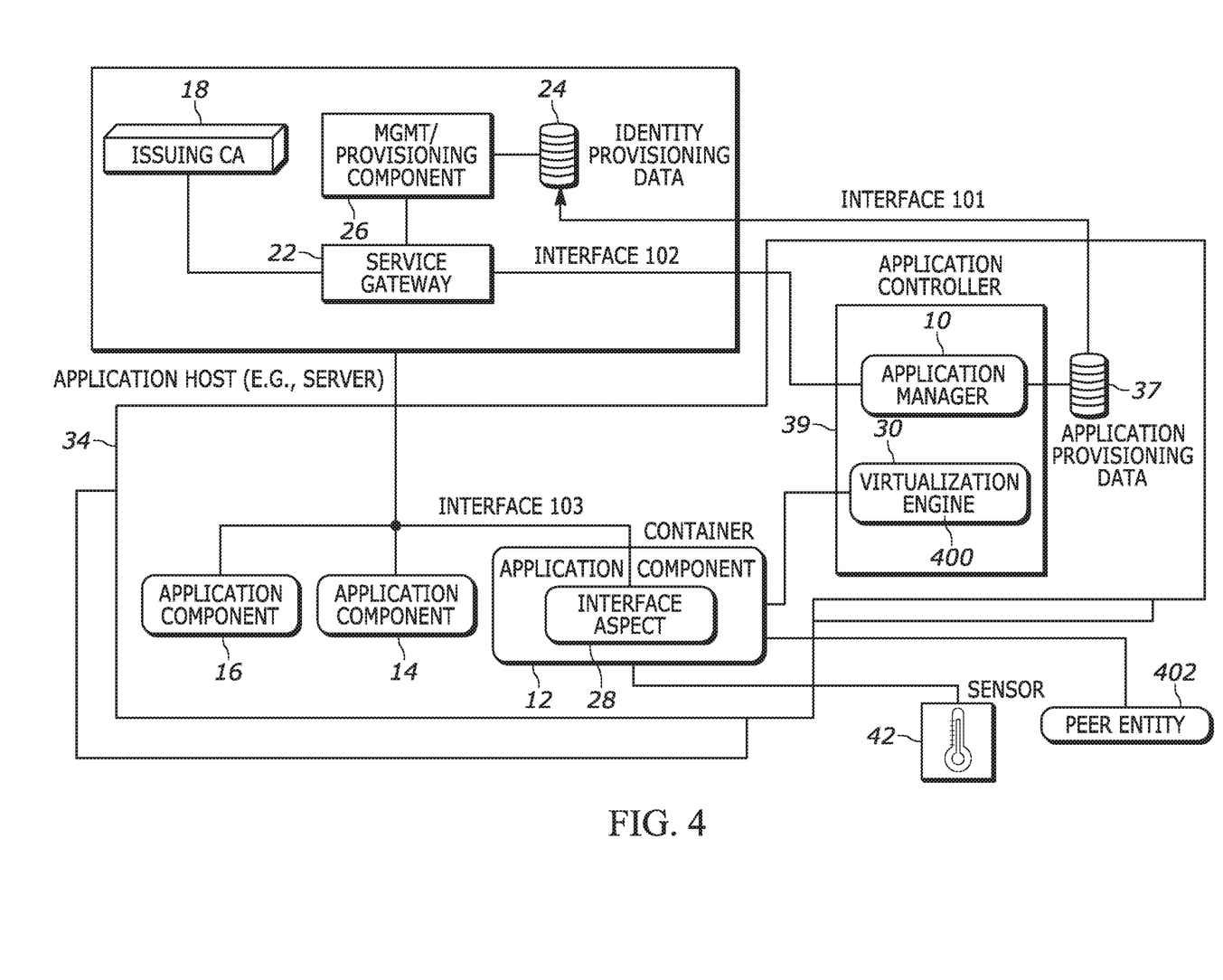
FIG. 4 is a functional block diagram according to one example set forth in the disclosure.

FIG. 4 is a functional block diagram similar to that shown in FIG. 1 that employs a virtualization engine 400. The operations can apply to a container environment (e.g., where a client interacts through an API or utility(ies) to make requests of a container "engine" like a Docker Engine) and can also apply to other virtualization environments (e.g. interacting through an API or utility(ies) to make requests of a virtual-machine hypervisor). The peers 402 in one example, may be monitoring stations of the sensors. The request for the operational identity by the application component to the CA is a request for a new certificate in this example and hence a new Identity2 wherein the first identity credential is revoked via the revocation of the public key certificate that was provided and serves as a type of one-time use identity. The new certificate, serves as the operational identity credential (Identity2) and includes the sensor information and another public and/or private key.

Figure 5:
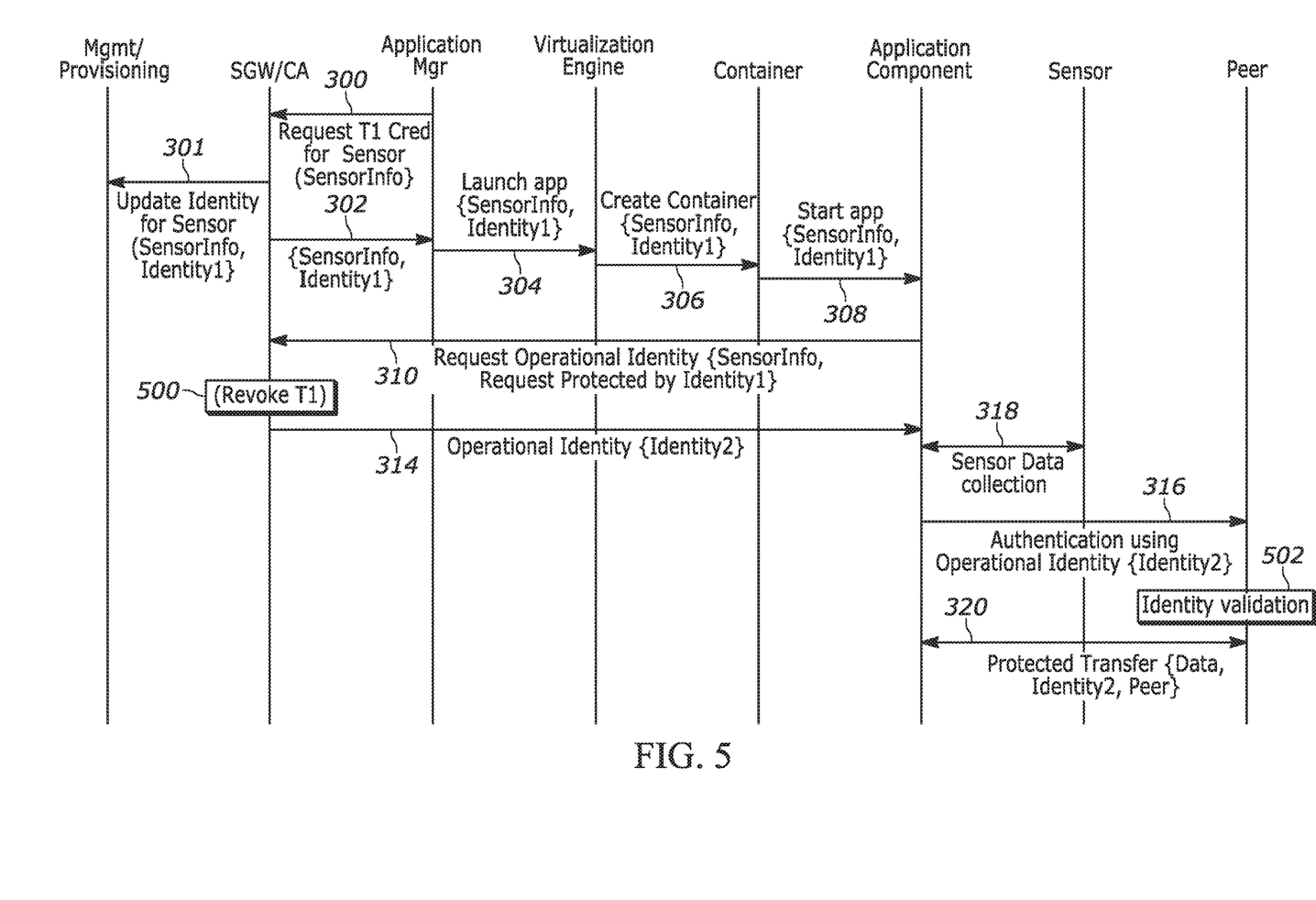
FIG. 5 is a communication flow diagram according to one example set forth in the disclosure.

FIG. 5 is a communication flow diagram similar to FIG. 3 based on the architecture shown in FIGS. 1 and 4. An operational scenario for an embodiment of a sensor application will be described. In this example, the application's instantiation is directed by the application manager 10 on platform P55. In this scenario the application manager 10 has identified a requirement for a thermocouple application A7 to monitor the thermocouple number 2 on furnace 5, vent 3. In this environment, this application is thus referred to by a unique identifier (e.g., SensorInfo) which is composed of these aspects: {A7/P55/F5/V3/T2} Note that the container remains anonymous—it simply provides a transient vehicle for execution of the application. The methodology associates cryptographically-secure, publishable credentials with this application's unique identifier through the methods illustrated above.

The application manager 10 requests 300 an identity credential (1) be created for the application component. The identity credential (i.e., certificate signed by the CA containing the unique identifier and a public/private key pair based on the unique identity) is created so as to contain the unique identity {A7/P55/F5/V3/T2}, encoded as appropriate to that credential's specifications, and the credential's association with the application is recorded 301 as the provisioning data in provisioning database 24. The identity credential is returned 302 to the application manager, who passes it 304 to the virtualization engine with its request to launch the application.

The virtualization engine 30 passes the identity credential 306 to the container which makes it available 308 to the application component. The application component uses this transient (e.g., one-time use) identity credential (i.e. Identity1) to request 310 a more-secure identity using methods consistent with best practices. This request 310 is signed using the public key of the transient identity credential and is validated against the provisioning information in provisioning database 24 and the credential info, and this new identity is returned 314 to the application who can use it in interactions with peers 402 in the execution of its tasks. In this embodiment and workflow, Identity1 is treated as a "one-time" use credential and is revoked 500 at this time. The peers can use the offered credential to authenticate 316 the identity 502 of the application (i.e. {A7/P55/F5/V3/T2}).

Figure 6:
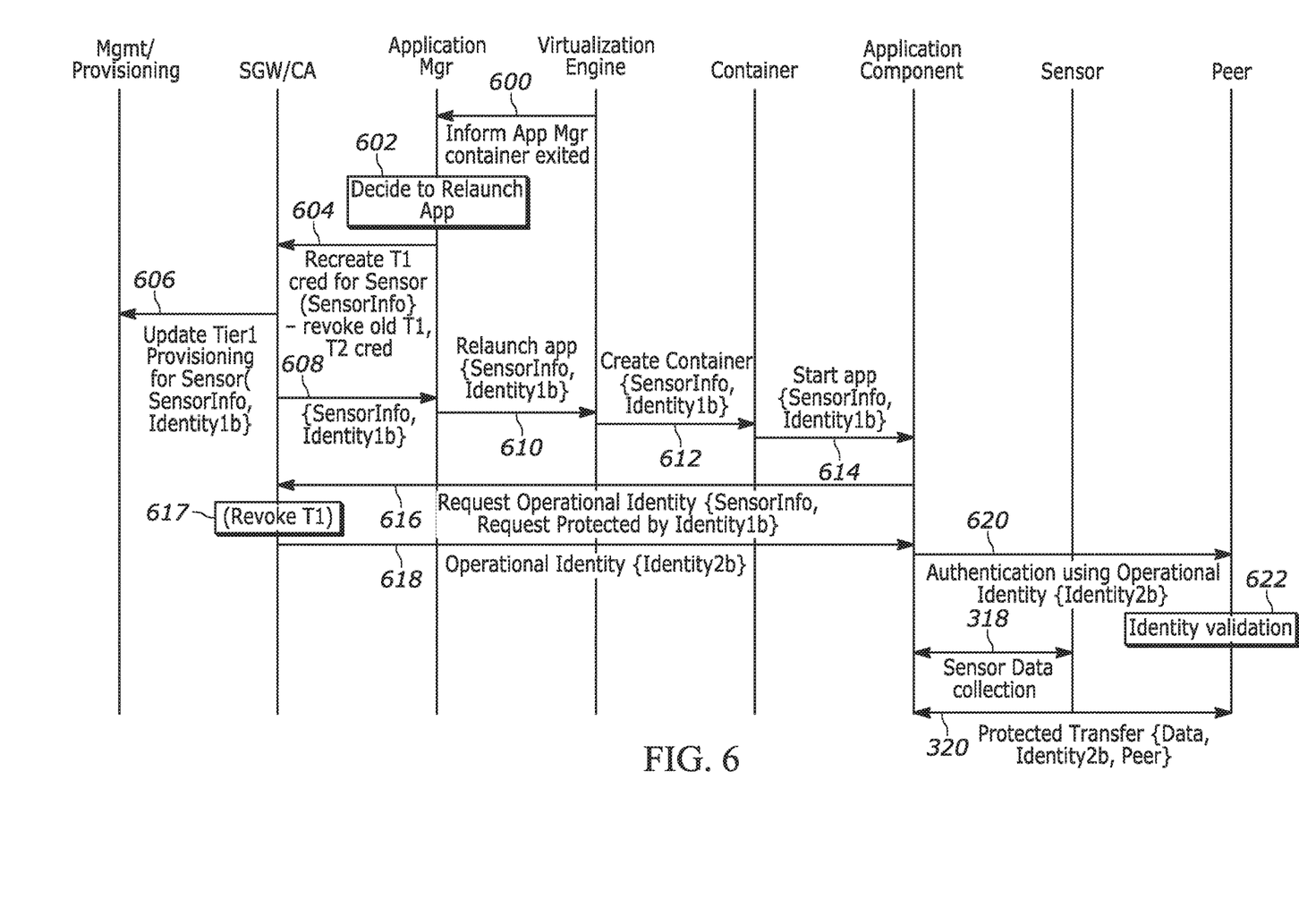
FIG. 6 is a communication flow diagram according to one example set forth in the disclosure.

FIG. 6 is a communication flow diagram illustrating relaunching of an application according to one example set forth in the disclosure. As shown, continuing with the scenario involving a sensor application, consider where the container exits. As is customary with these environments, the virtualization engine receives an indication that the container has exited (together with status and other information) and reclaims resources consistent with its operation. The application manager 10, on becoming aware of the container's exit, will perform business processes appropriate to its environment to determine the next course of action.

The application component may no longer be required—in such a case, the application manager 10 will not relaunch the application. The application manager in one example, terminates the identity to reflect this end-of-usefulness condition. The application manager updates the identity credential so that no further use can be made of that identity credential by this or another entity in the environment. For example, this is done through interface 102—this trusted agent communicates with the system (MP/SAW/provisioning server) to update the state of the device as recorded by the provisioning server to indicate the device whose identity is defined by that set of attributes should not be granted any further credentials or proof of identity. Thereafter, any subsequent requests for a new "first credential" will be denied.

The application component may still be required (it may have crashed or it may have been requested to exit so that the application image or another software component could be updated, etc.) so after the virtualization engine 400 informs 600 the application manager 10 that the container exited, the application manager 10 can decide to relaunch the app 602.

If the application component is to be relaunched, the application manager 10 requests 604 a credential for the application component, using the same tuple: {A7/P55/F5/V3/T2}. It is recognized that the initial identity credential (Identity1) and the operational (Identity2) credentials are no longer useful. If they have not already been revoked (e.g. T1 was never used; or was used and T2 had been created for the previous instance) they are revoked by the CA to ensure continued security and the new credential Identity1b is created so as to contain the identity {A7/P55/F5/V3/T2}, updated 606 in the provisioning database 24, and returned to the application manager 608.

The application manager 10 passes 610 to the virtualization engine 400 with its request to (re)launch the application component. The virtualization engine 400 passes 612 the credential 14 to the container which makes it available 614 to the application. In one example, the application component uses this transient identity credential to request 616 a more-secure identity (operational identity credential) using methods consistent with best practices. This request 616 is validated against the provisioning information and the credential info, and the relaunch identity credential is returned 618 to the application who can use it in interactions with peers in the execution of its tasks. Again, in this embodiment and workflow, Identity1 is treated as a "one-time" credential and is revoked 617 at this time.

The peers can use the offered credential to authenticate 620 the identity of the application. It's important to note that the peer receives and validates {Identity2b} 622 (the updated certificate). This is not an unusual change (certificates are continuously, if rarely, updated, as a matter of course) but the identity {A7/P55/F5/V3/T2} which was identified by the certificate is the same as for Identity2 (or any previous incarnation).

Figure 7:
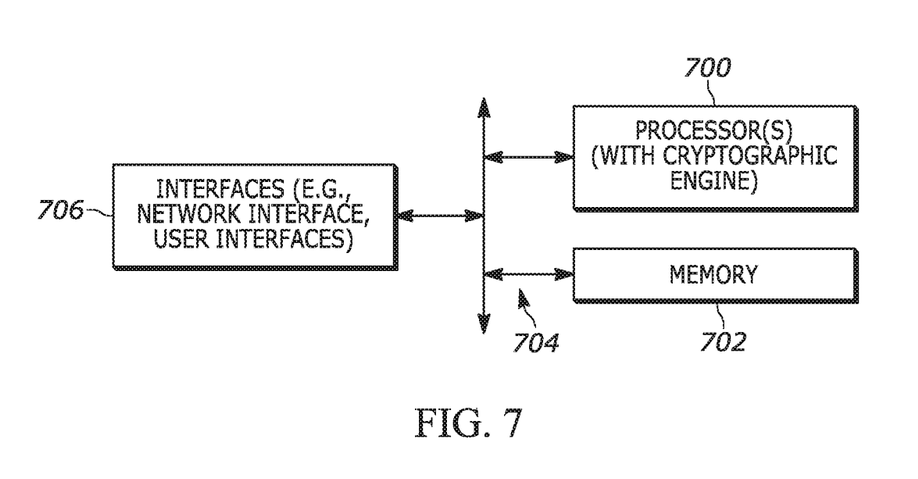
FIG. 7 is a block diagram of an example of a computing device for use as an identity management system and/or an application host according to the disclosure.

FIG. 7 illustrates a block diagram of the identity management system 36 and/or the application host 34 implemented as one or more computing devices having one or more processors 700 such as CPUs, DSPs, or any other suitable processor(s) and memory 702 that may be accessible by the one or more processors 700 through any suitable bus structure 704 as known in the art. The memory 702 may be any suitable memory including memory distributed through the network and/or local memory in the form of RAM, DRAM, ROM, EPROM or any other suitable memory. In this example, the memory 702 contains machine readable instructions that when executed cause the one more processors 700 to carry out the respective operations described herein. The processor(s) 700 serves as logic that is operative to perform the functions when executing the stored code. The computing devices may also be implemented in any other suitable from such as application specific integrated circuits (ASIC), state machines, or any suitable combination of hardware and stored software. The apparatus also includes, as known in the art, suitable interfaces 706 to provide interfaces to the network, user interfaces, or any other suitable interfaces that are needed.

In the preceding detailed description of the preferred embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation. For example, the operations described may be done in any suitable manner. The methods may be done in any suitable order still providing the described operation and results. It is therefore contemplated that the present embodiments cover any and all modifications, variations or equivalents that fall within the spirit and scope of the basic underlying principles disclosed above and claimed herein.

What is claimed is:

1. A method carried out by one or more computing devices, the method comprising;
   requesting, from a certification authority, a one-time use credential as a first identity credential for at least one of a plurality of application component instances of an application using a request that comprises: a unique application component instance identifier and a request for a public key and private key pair, the one-time use credential being limited to a single use in requesting a dynamically-created second identity credential for a same application component instance;
   requesting from a certification authority, the dynamically-created second identity credential for a same application component instance of the application using the one time use credential by issuing a request signed using at least one of a public key or private key of the public key and private key pair of the requested one-time use credential;
   receiving the dynamically-created second identity credential in response to the issued request; and
   using the dynamically-created second identity credential in a cryptographic function by the application component instance for one or more of encrypting information, verifying signatures or digitally signing data.

2. The method of claim 1, wherein the request for the created first identity credential is sent by an application manager.

3. The method of claim 1, wherein the request for the one-time use credential as the first identity credential and the request for the dynamically created second identity credential includes a unique identifier that uniquely identifies the application component instance.

4. The method of claim 3, wherein the application component instance interacts with an industrial sensor.

5. The method of claim 1 wherein the one-time use credential and the created second identity credential each comprise a PKI certificate produced by a certificate authority.

6. The method of claim 1 wherein a virtual machine receives the generated one-time use credential for the application component instance and passes the generated one-time use credential for the application component instance to a container that makes the first identity credential available to the application component instance.

7. A method carried out by one or more computing devices, the method comprising:
   requesting, from a certification authority, a one-time use credential as a first identity credential for at least one of a plurality of application component instances of an application using a unique identifier associated with the at least one application component instance, the one-time use credential being limited to a single use in requesting a dynamically-created second identity credential for a same application component instance;
   receiving a cryptographically generated one-time use credential as the first identity credential for the application component instance based on the unique identifier, in response to the request;
   providing the cryptographically generated one-time use credential by a virtualization engine for use by a container that contains the at least one application component instance, and
   requesting, from the certification authority, the second identity credential for the application component instance using a request signed based on the one-time use credential.

8. The method of claim 7, wherein the cryptographic function is an authentication operation.

9. The method of claim 7, wherein the request includes information that uniquely identifies the at least one application component instance.

10. The method of claim 9, wherein the at least one application component instance interacts with an industrial sensor.

11. The method of claim 7 wherein the one-time use credential comprises a public key infrastructure (PKI) certificate produced by a certificate authority.

12. The method of claim 7 wherein a virtual machine receives the generated one-time use credential for the application component instance and passes the generated one-time use credential for the application component instance to a container that makes the first identity credential available to the application component instance.

13. The method of claim 7 comprising:
   requesting the dynamically-created second identity credential for the application component instance using a certificate-signing request signed based on the one-time use credential;
   receiving the dynamically-created second identity credential in response to authentication of the one-time use credential; and
   using the dynamically-created second identity credential in a cryptographic function by the at least one application component instance.

14. One or more computing devices comprising:
   memory that stores executable instructions;
   at least one processor, operatively coupled to execute the executable instructions and based the execution:
      request, from a certification authority, a one-time use credential as a first identity credential for at least one of a plurality of application component instances of an application, the one-time use credential being limited to a single use in requesting a dynamically-created second identity credential for the at least one application component instance;
      request, from the certification authority, the dynamically-created second identity credential for the application component instance using a request signed based on the one-time use credential;
      receive the dynamically-created second identity credential in response to the request for the dynamically created second identity credential; and
      use the dynamically-created second identity credential in a cryptographic function by the application component instance for one or more of; encrypting information verifying signatures or digitally signing data.

15. The method of claim 14, wherein the request for the one-time use credential as the first identity credential and the request for the dynamically created second identity credential includes a unique identifier that uniquely identifies the same application component instance.

16. One or more computing devices comprising:
   memory that stores executable instructions;
   at least one processor, operatively coupled to execute the executable instructions and based the execution:
      request, from a certification authority, a one-time use credential as a first identity credential for an application component instance of a plurality of application component instances using a unique identifier associated with the application component instance and wherein the request is for a public key and private key pair, the one-time use credential being limited to a single use in requesting a second identity credential for a same application component instance;
      receive a cryptographically generated one-time use credential as the first identity credential for the application component instance based on the unique identifier, in response to the request, using at least one of a public key or private key of the public key and private key pair;
      provide the cryptographically generated one-time use credential by a virtualization engine for use by a container that contains the application component instance and
      request, from the certification authority, the second identity credential for the application component instance using a request signed based on the one-time use credential.

\* \* \* \* \*